June 12, 1923.

J. W. FLENDER 1,458,401

METHOD OF PRODUCING MOTION PICTURES

Filed Nov. 10, 1920    2 Sheets-Sheet 1

INVENTOR
John W. Flender,
by Wurter & Brown,
his attorneys.

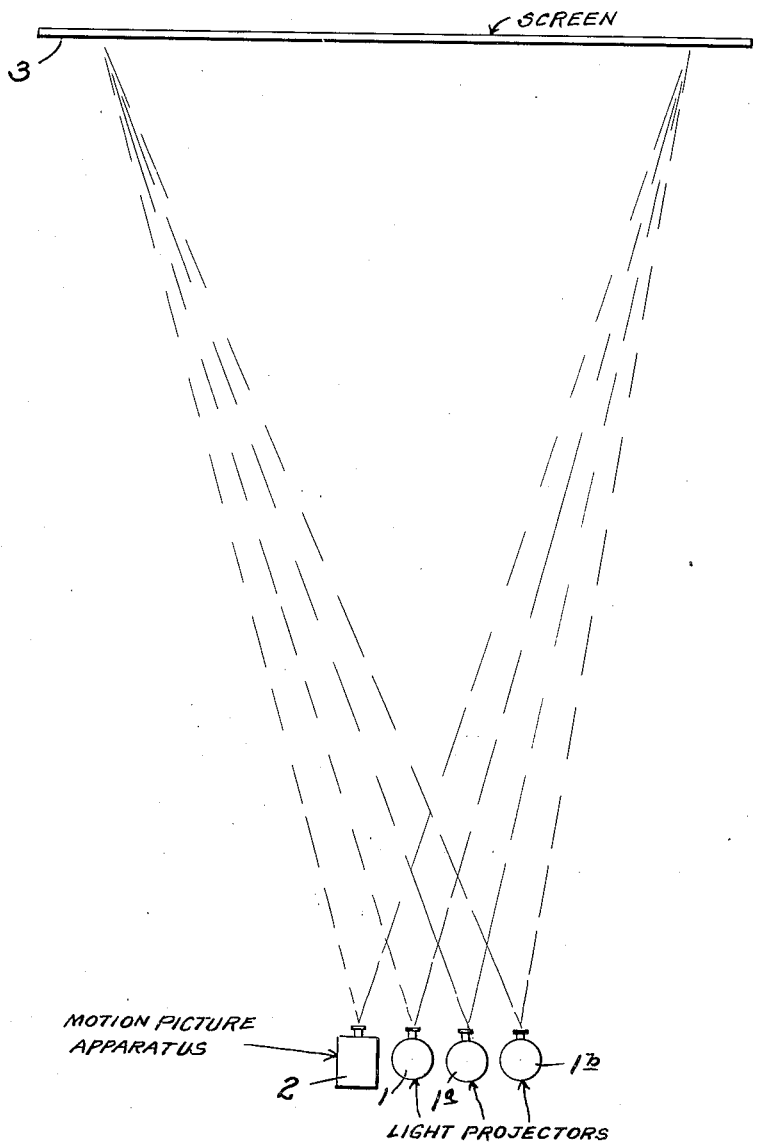

Patented June 12, 1923.

1,458,401

UNITED STATES PATENT OFFICE.

JOHN W. FLENDER, OF WEXFORD, PENNSYLVANIA, ASSIGNOR OF ONE-HALF TO HENRY BRAUN, OF PITTSBURGH, PENNSYLVANIA.

METHOD OF PRODUCING MOTION PICTURES.

Application filed November 10, 1920. Serial No. 423,355.

*To all whom it may concern:*

Be it known that I, JOHN W. FLENDER, a citizen of the United States, and a resident of Wexford, in the county of Allegheny and State of Pennsylvania, have invented a new and useful Improvement in Methods of Producing Motion Pictures, of which the following is a specification.

The object of the invention is to provide a simple and effective method of producing motion pictures whereby the resulting pictures will have depth and color tone, and will more accurately show, either in black and white or in colors, the color values of original settings.

In the practice of the invention in its preferred form the negative film is taken in the usual manner, and from it a positive is formed by exposing a sensitized film to light, the light being caused to simultaneously pass through the negative and a color filter having, or formed in black and white from a pattern having a plurality of equally-sized like-shaped areas of primary colors symmetrically arranged in such a manner that no two areas of the same color are in contact with each other. The positive films thus formed are then projected upon a screen of colors, the screen corresponding in its pattern and arrangement of colors with that of the filter used in forming the positive film, or the pattern from which the filter is made.

Figure 1:
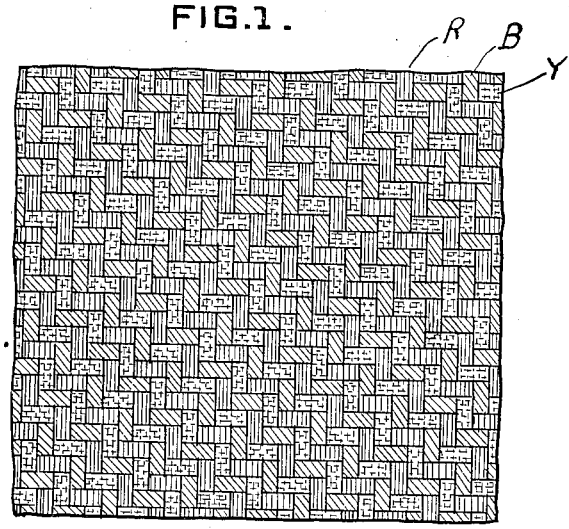
Figure 2:
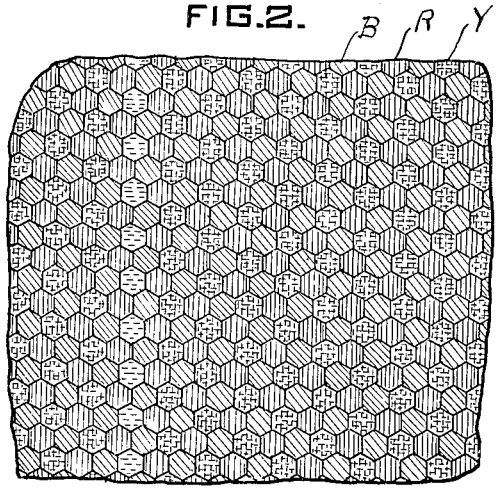

Two arrangements or patterns of colors suitable for use either as the color filter or the screen in the process are illustrated in the accompanying drawings, of which Fig. 1 shows the preferred arrangement and Fig. 2 a modified form. Fig. 3 is a diagrammatic plan view of a screen and projecting apparatus.

As previously stated, the negative film may be taken in the usual manner in which motion picture black and white negatives are now taken. Also, the forming of the positive may be accomplished in the usual manner, except that in the preferred practice of the invention the light is caused to pass through a color filter as well as through the negative. While filters of different colors and different arrangements of colors may be used, it is preferred to use a filter of three primary colors. Such colors may be, and preferably are, red, blue and yellow.

In the preferred arrangement or pattern of colors indicated in Fig. 1, each color area is rectangular in form, being twice as long as it is wide. These areas are indicated by shadings as well as by the letters R, B and Y for red, blue and yellow, and from such indication it will be observed that no two areas of the same color are in contact with each other. Furthermore, there are as many areas of one color as of any other color and the areas of one color are in the same symmetrical relation to each other as the areas of each of the other colors. In Fig. 2 there is similarly indicated an arrangement of colors in which each area is a hexagon.

As far as concerns symmetry and uniformity of design and total equalities of colors, the arrangement of Fig. 2 is the same as that explained with reference to Fig. 1. However, the design of Fig. 1 is preferable, because, among other reasons, it embodies the principle of the cross-line screen. As used herein, it removes pictures from photographic accuracy to more artistic conceptions. In the pattern of Fig. 1, the vertical lines are balanced or counteracted by the horizontal lines resulting in a pleasing woven appearance rather than a rosette design, which, in some cases, would be objectionable in the use of the pattern of Fig. 2.

By using such color filter in forming the positive, the pattern of the filter appears upon the positive in the form of graduations in the thickness or density of the coating. For example, the negative of a colored setting taken in the ordinary manner indicates in black and white the yellow of the original setting by a relatively great density of film coating. In producing a positive from a negative through the interposition of the color filter the intensity of the portion of the positive indicating the yellow of the original setting will be augmented. In a like manner, the other colors are selectively augmented so that the positive is a truer representation in black and white of the colors of the original setting than if the color filter were not used in producing the positive. Also, it being understood that the sensitiveness of the usual films is least to the colors at the red end of the spectrum, the colors under-exposed are accentuated and those overexposed are lessened by using the color filter in forming the positive. This general result is further attained when the positive is projected upon the screen of colors as will be presently explained.

The color filter used in forming the positive may be made by photographing on a small plate an original necessarily large pattern of colors of the character indicated in the drawings. The necessity of having an original large pattern of colors arises from the practical difficulties involved in making an accurate pattern of intense colors when each individual area is small. The plate thus photographically produced will have, in black and white gradations of coating, the pattern of colors in smaller dimensions than the colors themselves could be readily applied to a filter. In forming the positive, the plate may be placed on one side and the sensitized film on the other side of a negative, and the light caused to pass through both the filter plate and negative. Instead of first photographing the color pattern, a filter having the original pattern in colors on it may be placed between a source of illumination and a condensing lens, and the negative and sensitized film placed on the opposite side of such lens for the purpose of forming the positive. The resulting positive in each manner of procedure is the same. Hence the expression "color filter" as used herein is to be understood as either an actually colored filter or a filter on which the pattern of actual colors is photographically or otherwise produced.

A positive film produced in the manner explained is projected upon a screen of colors corresponding to the color filter. This may be done in various ways. For example, the screen itself may be painted, the several primary colors being arranged to form the same pattern as the color filter. However, as indicated in Fig. 3, the coloring on the screen is preferably affected by light projection, a light projector in the form of a spot light 1 being placed adjacent to the moving picture machine 2 and arranged to project the color pattern upon the screen 3 simultaneously with the projection of the moving pictures upon it. A single light projector may be thus used, in which case the colors may be formed by placing in the path of the projected light a color filter the same as that used in producing the positive film. However, to produce greater intensity of the necessary small patches of color, three light projectors 1, 1ª and 1ᵇ may be used, one for each of the primary colors. In the latter case, if the color filter used in producing the positive were of the arrangement shown in Fig. 1, an opaque screen provided with openings, formed and arranged the same as all the areas of one color in the arrangement of Fig. 1, may be placed, one in the path of each of the three projected beams, and these openings may be covered by colored glass or like colored material. By bringing into registry the three beams so projected, a screen of colors arranged the same as Fig. 1 may be produced. In all cases, however, it is desirable to have the areas of colors on the screen of the same size and form as the pattern areas projected upon the screen resulting from the light passing through the positive film.

Instead of projecting each picture of the positive film upon the full color screen, the areas of one primary color may be projected upon or rendered visible on the screen simultaneously with the projection of one film picture, those of another color with the next film picture, and so on in rotating sequence, with the result that the original colors of the settings will be more pronounced. This may be accomplished in various ways, in all of which it is desirable to bring the pattern of the positive film in registry with the pattern of colors on the screen. For example, in the projection of colors upon the screen by the use of three screened beams of light, the sequence of the primary colors may be produced by successively shutting off the light of the beams. Also, when the colors on the screen are produced by a single beam, a black and white filter in which the white forms the pattern of one color may be placed in the path of the beam and moved to successively block out the colors on or projected upon the screen, such movements being in sequence with the successive projection of pictures upon the screen.

In describing the making of a positive by the use of a color filter, it has been explained that the positive is so modified that the underexposed colors are accentuated and those overexposed are lessened. When the positive is projected upon the colored screen, the patterns of each being in registry, the several colors on the screen will be so dissolved and heightened as to further compensate for the underexposed and overexposed colors as taken on the negative film.

By practicing the invention in the manner just explained, the resulting pictures will have a maximum depth and atmosphere, and will also have a color tone approaching that of the original settings from which the pictures were taken. The result may be measurably obtained by projecting the usual black and white positive upon a screen of colors such as explained above, the formation of the positive being unmodified by the use of a color filter.

No claim is made herein to the color screen aside from its use in the method of producing motion pictures. The color screen in itself is claimed in a divisional application.

I claim:

1. The method of producing atmospheric depth and color tone in motion pictures, which consists in projecting such pictures upon a screen having a plurality of equal-sized like-shaped areas of primary colors symmetrically arranged with no two areas of the same color in contact with each other.

2. The method of producing atmospheric depth and color tone in motion pictures, which consists in projecting such pictures upon a screen of three primary colors comprising rectangular areas twice as long as they are wide, said areas being symmetrically arranged with no two areas of the same color in contact with each other.

3. The method of producing motion pictures which consists in forming a positive film by exposing a sensitized film to light through a negative film and a patterned filter, and in projecting the positive upon a screen having a plurality of equal-sized like-shaped areas of primary colors symmetrically arranged with no two areas of the same color in contact with each other, the pattern of said filter corresponding in form to the pattern of said screen.

4. The method of producing motion pictures which consists in forming a positive film by exposing a sensitized film to light through a negative film and a color filter having a plurality of equal-sized like-shaped areas of primary colors symmetrically arranged with no two areas of the same color in contact with each other, and in projecting the positive upon a screen of colors corresponding to said color filter.

In testimony whereof, I have hereunto set my hand.

JOHN W. FLENDER.

Witness:
EDWIN O. JOHNS.